United States Patent
Schultz

(10) Patent No.: US 7,546,470 B2
(45) Date of Patent: Jun. 9, 2009

(54) SELECTIVE COMPUTER COMPONENT ACTIVATION APPARATUS METHOD AND SYSTEM

(75) Inventor: Craig Frederick Schultz, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 968 days.

(21) Appl. No.: 10/640,074

(22) Filed: Aug. 13, 2003

(65) Prior Publication Data

US 2005/0039061 A1 Feb. 17, 2005

(51) Int. Cl.
*H04L 9/00* (2006.01)
(52) U.S. Cl. ..................... 713/182; 709/221
(58) Field of Classification Search ................. 713/182, 713/189, 155, 310; 726/3, 4; 709/217, 221, 709/223
See application file for complete search history.

(56) References Cited

U.S. PATENT DOCUMENTS

| | | | |
|---|---|---|---|
| 6,110,228 A | 8/2000 | Albright et al. | 717/11 |
| 6,111,882 A | 8/2000 | Yamamoto | 370/399 |
| 6,301,484 B1 * | 10/2001 | Rogers et al. | 455/466 |
| 6,418,554 B1 | 7/2002 | Delo et al. | 717/11 |
| 6,434,532 B2 | 8/2002 | Goldband et al. | 705/7 |
| 6,523,166 B1 | 2/2003 | Mishra et al. | 717/11 |
| 6,581,069 B1 * | 6/2003 | Robinson et al. | 707/104.1 |
| 6,694,384 B1 * | 2/2004 | Moeller et al. | 710/8 |
| 6,829,704 B2 * | 12/2004 | Zhang et al. | 713/1 |
| 7,366,768 B2 * | 4/2008 | Deo et al. | 709/217 |
| 2002/0152401 A1 * | 10/2002 | Zhang et al. | 713/201 |
| 2002/0165819 A1 | 11/2002 | McKnight et al. | 705/39 |
| 2003/0009752 A1 | 1/2003 | Gupta | 717/171 |

FOREIGN PATENT DOCUMENTS

EP  0 887 754  12/1998

* cited by examiner

*Primary Examiner*—Beemnet W Dada
(74) *Attorney, Agent, or Firm*—Kunzler & McKenzie

(57) ABSTRACT

An apparatus for selectively activating a component on a computing device includes an authorization server that authorizes activation of a component on a computing device in response to an activation request, a component management module that activates the component in response to receiving authorization from the authorization server, and a tracking system that receives transaction data corresponding to the component in response to activating the component. The apparatus may also include a billing system that charges a customer account in response to activation of the component. In certain embodiments, the component management module includes a detection module that requests component activation in response to detecting an increased computing load on the computing device. The detection module may also request component deactivation in response to detecting a decreased computing load on the computing device. Thus the present invention integrates dynamic adjustment of computing power with secure transactions and automatic billing.

30 Claims, 7 Drawing Sheets

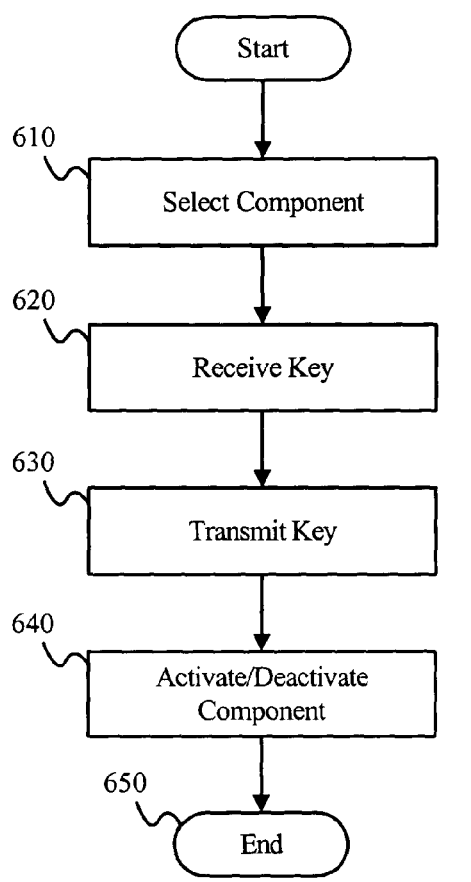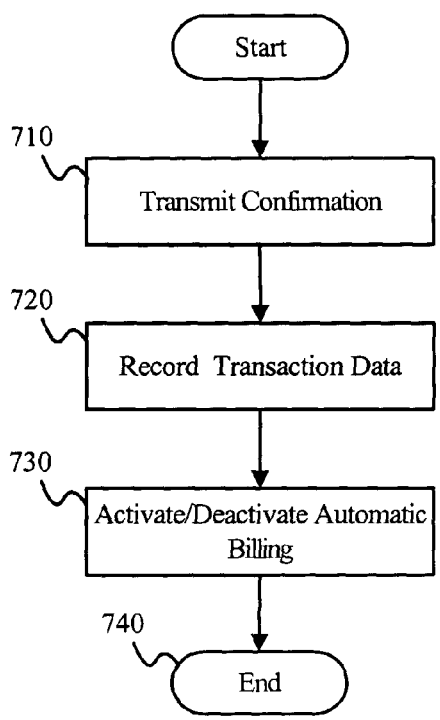
Fig. 6
Fig. 7

SELECTIVE COMPUTER COMPONENT ACTIVATION APPARATUS METHOD AND SYSTEM

BACKGROUND OF THE INVENTION

1. Field of the Invention

The present invention relates to managing workloads on computing devices. Specifically, the invention relates to apparatus, methods, and systems for dynamically and securely activating and deactivating components on a computing device.

2. Description of the Related Art

Businesses and other organizations frequently encounter seasons or periods which require increased processing capacity in order to expedite potentially lucrative opportunities. Traditionally such situations have required businesses to add processing capacity by upgrading their existing equipment, renting additional equipment, or purchasing additional equipment to meet the increased demand. Alternately, businesses may choose to make due with their existing equipment and hope for the best. Due to the significant implications of the various choices, such opportunities, while potentially lucrative, often place MIS personnel and company officers in a difficult situation at a time when their focus would best be directed to expediting the opportunity at hand.

Typically, when a customer desires to upgrade a computing system or device, the customer or an outside contractor purchases new components and installs the components in the computing system or device. Often new software must also be installed to enable the new components to work correctly. Consequently, purchasing and installing new components and software is an expensive, time-consuming process that results in much inefficiency.

Inefficiency also occurs when the extra computing power obtained from upgraded components is only needed for short periods of time. For instance, an online retailer may need extra computing power only during a peak shopping period, such as Christmas. The high volume of sales, returns, inventory ordering, and the like during Christmas requires additional processing power and higher bandwidth on communications links. When the Christmas shopping season ends, however, the need for the extra computing power also diminishes, resulting in high-capacity components that are underutilized for the rest of the year.

One possible solution to this problem is to rent high performance components during peak periods. Renting the components solves the problem of using expensive, upgraded components all year long. However, installing software and configuring the rented components to interface with a business's current software system may be just as difficult and expensive as upgrading. Time and opportunity may be squandered as employees integrate the rented system with the existing system. In addition, if the rented system is much different from the existing system, expensive training may be necessary to teach employees how to use the rented system.

Upgrading computing capacity or purchasing additional equipment under such situations is typically expensive, time consuming, and error prone. Initial costs for installing or upgrading such equipment may be very high. Significant downtime of currently available resources may occur, placing the organization in jeopardy of achieving its business goals. Considerable lead times may be involved in order to obtain and deploy the needed equipment.

The delays, costs, and risks associated with upgrading, renting, or adding equipment may significantly decrease earnings and profits associated with a particular opportunity. Given the delays, costs, and risks associated with upgrading or adding equipment, organizations may choose to make due with their existing equipment. However, a strategy of making due is also fraught with problems and pitfalls. For example, computing systems may be strained and fail under the heavy computing loads associated with the opportunity.

In addition to the challenges to the computing consumer, manufacturers of computing related components and systems are also presented with significant dilemmas in meeting the needs of their customer base in a timely, cost-effective manner. For example, in order to match the capacity of computing components and systems to the needs of their customers, manufacturers are often required to design, order, build, and stock components of various capacities.

Like their computing consumers, designing, ordering, building, and stocking components of various capacities in the highly dynamic field of computing devices and systems presents computer manufacturers with some difficult decisions. On one hand, manufacturing efficiency is optimized if production and delivery systems can focus their resources on a few select products and configurations with long order and delivery cycles. On the other hand, customer demand and satisfaction is increased with a wide range of products and configurations with short order and delivery cycles. A further complication is the short life cycle of computing components and the downward price pressures associated with soon-to-be obsolete products.

Typically, manufactures must make demand projections for specific products and configurations in order to match their manufacturing and delivery capacity to the expected demand. However, such projections are often highly speculative, resulting either in under-capacity and inability to deliver goods, or over-capacity and increased costs and overhead for those goods.

In order to reduce the costs and risks associated with such activities, manufacturers often elect to focus their offerings on a few standard products and configurations with more predictable demand profiles rather than risk losing money on speculative products. While such a strategy reduces risks, potentially lucrative products may be dropped, resulting in missed opportunity for the manufacturer.

Accordingly, a need exists for cost-effective apparatus, methods, and systems for providing scalable, on-demand computing capacity to computing consumers, particularly for high-demand periods and seasons. Such on-demand computing apparatus, methods, and systems would increase customer selection while reducing the cost to manufacturers of providing tailored solutions to computing consumers.

BRIEF SUMMARY OF THE INVENTION

The present invention has been developed in response to the present state of the art, and in particular, in response to the problems and needs in the art that have not yet been fully solved by currently available component upgrading methods, apparatus, and systems. Accordingly, the present invention has been developed to provide an apparatus, method, and system for dynamically upgrading or downgrading components that overcomes many or all of the above-discussed shortcomings in the art.

In a first aspect of the present invention, an apparatus for selectively activating a component on a computing device includes an authorization server that authorizes activation of a component on a computing device in response to an activation request, a component management module that activates the component in response to receiving authorization from the authorization server, and a tracking system that receives transaction data corresponding to the component in response to activating the component. The present invention may be used to dynamically activate and deactivate computing capacity in a convenient, secure, and scaleable manner.

In certain embodiments, the apparatus includes a billing system that generates charges against a customer account in response to activation of the component. The charges may be based on capacity or usage of the component. In addition, the billing system may also eliminate charges against a customer account in response to deactivation of the component.

The authorization module may transmit an encrypted key to the component management module in response to authorizing activation of the component. In certain embodiments, the computing device may include an activation module that receives the encrypted key from the component management module and activates the component in response to receiving the encrypted key.

One embodiment of the computing device also includes a detection module that requests component activation in response to detecting an increased computing load on the computing device. The detection module may also request component deactivation in response to detecting a decreased computing load on the computing device. By monitoring the computing load on the computing device and requesting component activation or deactivation accordingly, the detection module facilitates dynamically adjusting computing resources on the computing device.

The component management module may provide an interface for a customer to activate or deactivate the component in response to an increased or decreased need for computing capacity. In addition to activating the component in response to receiving authorization, the component management module may also deactivate the component in response to an authorized deactivation request. Components may be activated during peak computing periods and deactivated during periods of low computing activity to lessen component usage costs.

The component management module may also include a remote access module that communicates with the authorization server via an intersite network. In one embodiment, the intersite network is a wide area network, and in another embodiment, the intersite network is the Internet.

Selected embodiments of the component management module include a component selection module that selects the component from a group of components on the computing device. The component selection module may be used by a customer to manually select a component to activate or deactivate on the computing device.

The component management module may also manage a log and append transaction data in response to activating or deactivating the component. Transaction data includes data such as component identification data, user identification data, time data corresponding to a time of activation of the component, billing data, and the like.

As used within this specification, the term components may refer to specific devices or modules or combinations thereof within a computing device or system. Components may also correspond to specific resources such as storage capacity, communication bandwidth, or processing throughput within a computing device or system. Examples of components include logical or physical storage devices, storage space within logical storage devices, physical storage devices, solid-state memory devices, rotational memory devices, or the like. Additional examples include specific processor instructions, microcode instructions, software modules, network bandwidth, processors, program memory, and the like. A component may also be a controller, a peripheral interface card, a communications channel, or the like.

In another aspect of the present invention, a method for selectively activating a component on a computing device includes requesting authorization to activate a component on a computing device, activating the component in response to receiving authorization, and recording transaction data corresponding to the component in response to activating the component. The method may also include deactivating the component in response to receiving authorization to deactivate the component.

In certain embodiments, the method includes one or more actions that occur in response to activating or deactivating the component. For instance, the method may include requesting payment from a customer in response to activating or deactivating the component. The method may also include transmitting an activation confirmation in response to activating or deactivating the component.

In certain embodiments, receiving authorization includes receiving an encrypted key. Activation of a selected component may occur in response to receiving the encrypted key. Consequently, the method of the present invention provides a secure process for activating components, recording transaction data, and billing customers.

In another aspect of the present invention, a method for selectively activating a component in a computing device includes receiving a request to authorize activation of a component on a computing device, transmitting authorization to the computing device in response to authorizing the request, and receiving confirmation of the activation of the component in response to activation of the component.

The method may further include recording transaction data corresponding to the component in response to receiving confirmation of the activation of the component. In addition, the method may also include charging a customer account in response to receiving confirmation of the activation of the component.

Various elements of the present invention are combined into a system for selectively activating a component on a computing device that may include a customer site, an intersite server residing at the customer site operably connected to an intersite network, a control console residing at the customer site operably connected to the intersite server, a computing device residing at the customer site operably connected to the control console, an authorization server operably connected to the intersite network, a component management module residing on the control console, and a tracking system operably connected to the intersite network.

The elements of the system have different functions. For instance, the authorization server may authorize activation of a component on the computing device in response to receiving a request. Activation of the component may be accomplished by the component management module in response to receiving authorization from the authorization server. In response to activating the component, the tracking system may receive transaction data corresponding to the component. Moreover, the component management module may also deactivate the component in response to an authorized deactivation request.

In certain embodiments, the system may include a billing system operably connected to the intersite network that charges a customer account in response to activating the component. Additionally, the system may include at least one support console that receives support requests from the customer site and performs support operations on the computing device.

The various elements and aspects of the present invention facilitate integrating dynamic component activation and deactivation, customer billing and tracking, and transaction security. The present invention facilitates manufacturing standard products and configurations that can be dynamically tailored to the current needs of the computing consumer. These and other features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 6 is a flow chart diagram illustrating another embodiment of the component management method of the present invention;

FIG. 7 is a flow chart diagram illustrating one embodiment of an transaction data recording method of the present invention.

DETAILED DESCRIPTION OF THE INVENTION

It will be readily understood that the components of the present invention, as generally described and illustrated in the Figures herein, may be arranged and designed in a wide variety of different configurations. Thus, the following more detailed description of the embodiments of the apparatus, method, and system of the present invention, as represented in FIGS. 1 through 8, is not intended to limit the scope of the invention, as claimed, but is merely representative of selected embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be a identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 1:
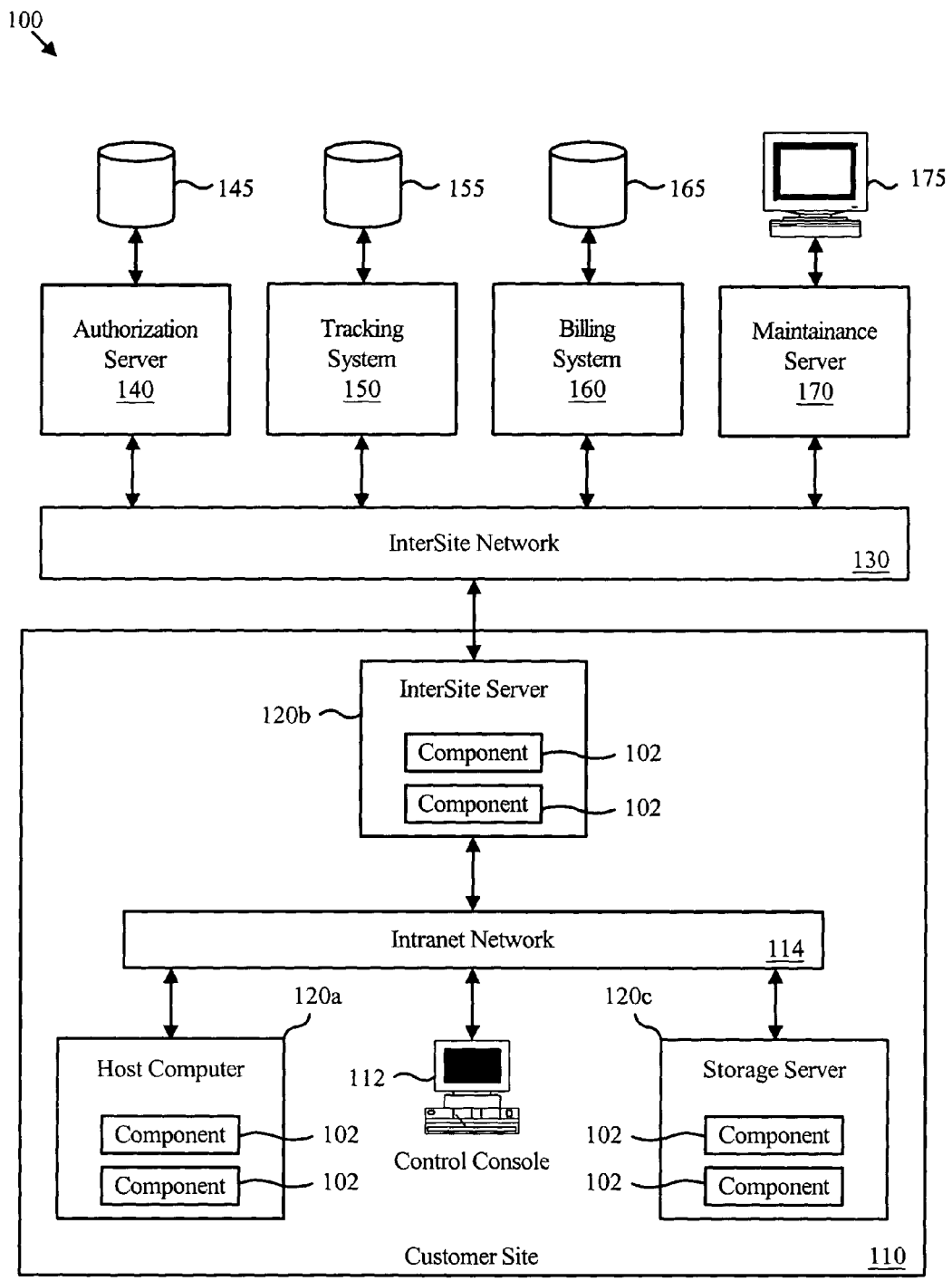
FIG. 1 is a schematic block diagram illustrating one embodiment of a selective component activation system of the present invention.

FIG. 1 is a schematic block diagram illustrating one embodiment of a selective component activation system 100 of the present invention. The depicted embodiment of the selective component activation system 100 includes a customer site 110, an intersite network 130, an authorization server 140, a tracking system 150, a billing system 160, a maintenance server 170, a support console 175, and related storage systems 145, 155, and 165. The depicted customer site 110 includes components 102, a control console 112, an intranet network 114, and computing devices 120 such as a host computer 120*a*, an intersite server 120*b*, and a storage server 120*c*.

In the depicted embodiment, the various computing devices 120 at the customer site 110 contain components 102 that may be selectively activated or deactivated to increase or decrease the computing power of the computing devices 120. A computing device 120 may automatically initiate activation or deactivation of a particular component 102, or alternatively, a user may manually initiate activation or deactivation of a particular component 102. Activation and deactivation of a particular component 102 is authorized by the authorization server 140.

In certain embodiments, charges are generated against a customer account corresponding to the user in response to activation of the component 102, and cessation of the charges against the customer account occurs in response to deactivation of the component 102. Consequently, the selective component activation system 100 may provide seamless financial transactions in response to activation or deactivation of the component 102.

Within the customer site 110, each of the computing devices 120 may communicate with the control console 112 via the intranet network 114 or similar means. In the depicted embodiment, the control console 112 communicates with the authorization server 140 via intervening networks, including the intersite network 130, the intersite server 120*c*, and the intranet network 114. In another embodiment (not depicted), the control console 112 may be connected to the intersite network 130 independent of the intersite server 120*c*.

In one embodiment, the computing devices 120 send activation or deactivation requests to the control console 112, which in turn sends the requests to the authorization server 140. In another embodiment, the computing devices 120 send activation or deactivation requests directly to the authorization server 140. In addition, a user may send activation or deactivation requests to the authorization server 140 via the control console 112.

In addition to sending activation and deactivation requests, the control console 112 may include a component management module (not shown) that allows a user to select a particular component 102 on a computing device 120 for activation or deactivation. In certain embodiments, the component management module maintains a log that records information pertaining to activation and deactivation of components 102. Additionally, the component management module may receive authorization to activate or deactivate a component 102 from the authorization server 140 and send the authorization in turn to the computing devices 120.

Each of the depicted computing devices 120 is only an illustrative example of a computing device 120; other computing devices 120 and components 102 may be derived by one of ordinary skill in the art. In addition, the computing devices 120 may have more components 102 than those depicted in FIG. 1. Furthermore, within each component 102 more components 102 may exist. For example, within the storage server 120c, one component 102 might be a storage controller, and within the storage controller, one component 102 might be a module that supports a storage device protocol.

In one embodiment, the computing devices 120 include a maximum number of components 102 when the computing devices 120 are initially built and shipped to the customer site 110. Including a maximum number of components 102 in each computing device 120 simplifies assembly of the computing devices 120 and streamlines inventory control processes. In another embodiment, the computing devices 120 are configured with one of several ranges of components 102 such as a low range, a medium range, and a high range. Pre-configured ranges reduces the number of products a manufacturer must design, build, stock, and ship while providing a virtual unlimited number of configurations to computing consumers.

In certain embodiments, the host computer 120a is a mainframe computer or the like. Terminal computers (not shown) or other client computers (not shown) may access the host computer 120a via the intranet 114 or an external network (not shown). Typical components 102 on the host computer 120a may include computer processors (CPUs), data channels, memory ports, cache memory, direct access storage devices, controllers, software modules, software drivers, and microcode instructions that perform operations on hardware devices.

The following example illustrates one manner of component activation on the host computer 120a. Client computers utilizing increased processing power on the host computer 120a may require the number of processors working on the host computer 120a to be increased by activating one or more additional processors. Data channels and memory ports may also be activated to increase data throughput, and microcode instructions may be activated to direct instructions to and from the newly activated hardware components 102.

The storage server 120c may include components such as storage controllers, cache memory, storage devices such as tape drives or the like, and corresponding processor or microcode instructions that perform operations on the aforementioned components 102. In one example of component 102 activation, the storage server 120c requests activation of an additional tape drive to increase storage space. In another example, available cache memory is reduced on the storage server 120c in response to a reduced computing load on the storage server 120c.

The intersite server 120b facilitates communication with the authorization server 140. In one embodiment, the intersite server 120b operably connects to the Internet in addition to communicating with the authorization server 140. In another embodiment, the intersite server 120b communicates with the authorization server 140 via the Internet. Components 102 on the intersite server may include direct access storage devices, cache memory, processors, controllers, and the like.

The intersite network 130 operably connects the intersite server 130 with the authorization server 140. In one embodiment, the intersite network is a wide area network (WAN). Other embodiments of the intersite network 130 include virtual private networks (VPN) and the Internet.

As discussed previously, the authorization server 140 authorizes activation or deactivation of a particular component 102. In certain embodiments, the authorization server 140 receives requests to activate or deactivate components 102 from the control console via the intersite server 120b and the intersite network 130. The authorization server 140 may contain one or more software modules (not shown) to determine whether the request comes from an authorized customer site 110.

In certain embodiments, in response to determining that the request came from an authorized customer site 110, the authorization server 140 may transmit an encrypted key to the control console 112 via the intersite network 130, the intersite server 120b, and the intranet network 114. In response to receiving the encrypted key, the control console 112 sends the encrypted key to the computing device 120 that contains the desired component 102 to be activated or deactivated. The computing device 120 may then activate or deactivate the component 102 in response to receiving the encrypted key.

In one embodiment, the authorization server 140 may send multiple encrypted keys simultaneously to activate or deactivate multiple components 102. Alternatively, the authorization server 140 may send one encrypted key to the control console 112 that authorizes activation or deactivation of multiple components 102.

The tracking system 150 tracks transaction data corresponding to the components 102, such as activation and deactivation times, customer identification names and numbers, and component 102 identification numbers. In one embodiment, the tracking system 150 resides on the authorization server 140. In another embodiment, the tracking system 150 resides on a server independent of the authorization server 140.

The billing system 160 generates charges to a customer account in response to component 102 activation and ceases to charge a customer account in response to component 102 deactivation. Like the tracking system 150, the billing system 160 may reside on the authorization server 140 or on a separate server.

The support console 175 and the maintenance server 170 may receive error messages from the control console 112 via the intervening networks. Error messages may include software error messages and hardware error messages. In addition, the support console 175 may perform operations or tasks on the computing devices 120 such as diagnostic tests, repair operations, and error recovery operations.

The depicted storage systems 145, 155, and 165 may contain one or more storage devices (not shown), such as a redundant set of storage devices. The storage devices may hold tracking system 150 data, billing system 160 data, authorization server 140 data, and maintenance server 170 data. In the depicted embodiment, the authorization server 140, the tracking system 150, and the billing system 160 are operably connected to the storage systems 145, 155, and 165 respectively.

The selective component activation system 100 provides nearly instantaneous upgrades and downgrades to computing devices 120. Authorization, billing, tracking, activation, and deactivation are seamlessly completed, eliminating the complexity of currently available upgrade processes and systems. Moreover, users or computing devices 120 at the customer site initiate component 102 activation and deactivation, and therefore the users have greater control over their computing devices 120.

Figure 2:
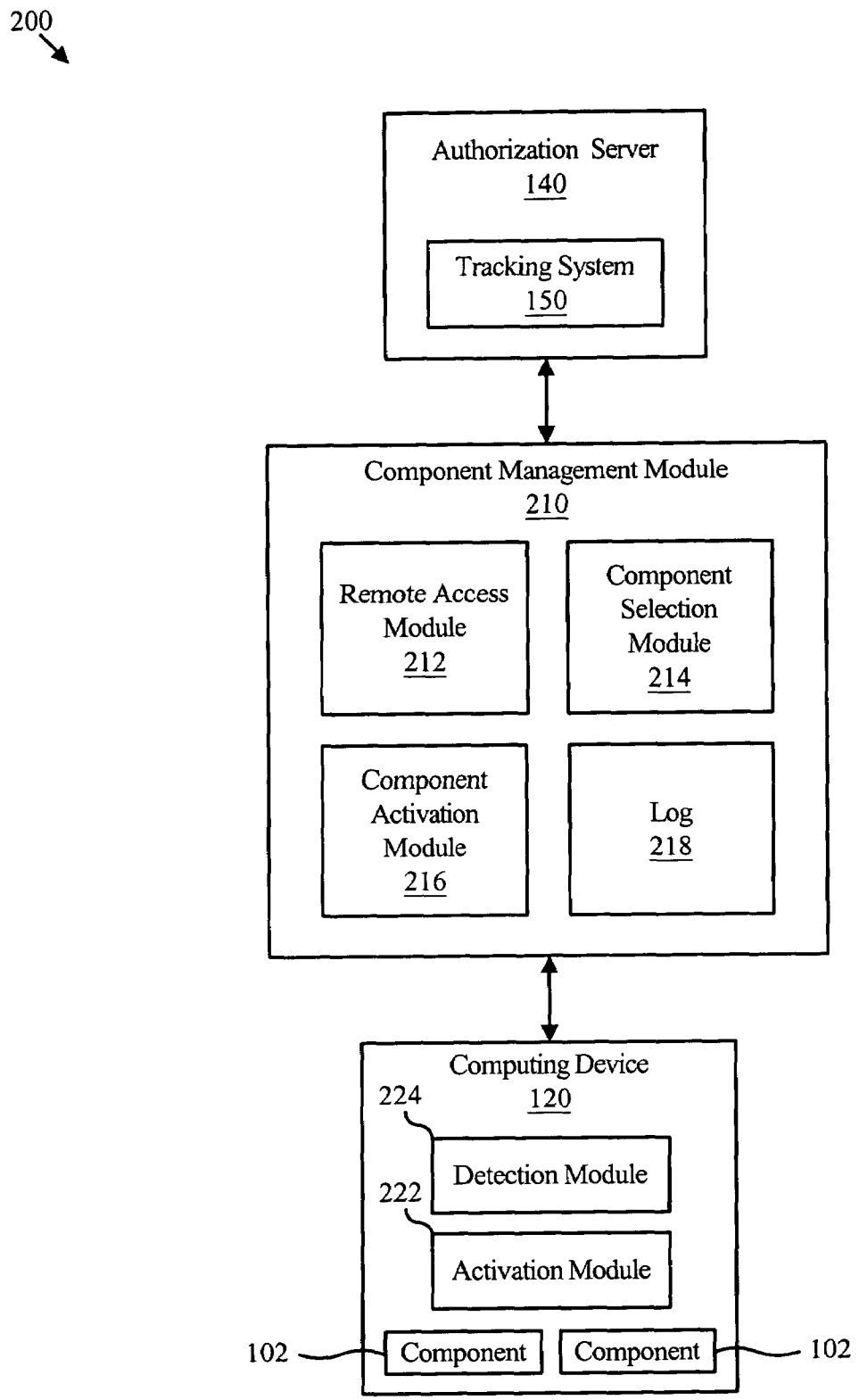
FIG. 2 is a block diagram illustrating one embodiment of a selective component activation apparatus of the present invention.

FIG. 2 is a block diagram illustrating one embodiment of a selective component activation apparatus 200 of the present invention. The component activation apparatus 200 may be used in conjunction with the system 100 of the FIG. 1 or may be implemented independent thereof. The depicted embodiment of the selective component activation apparatus 200 includes a computing device 120, an authorization server 140, a tracking system 150, and a component management module 210. The depicted computing device 120 includes components 102, an activation module 222, and a detection module 224. The depicted component management module 210 includes a remote access module 212, a component selection module 214, a component activation module 216, and a log 218.

In one embodiment, the component management module 210 resides on a control console such as the control console 112 of FIG. 1. In other embodiments, the component management module 210 may reside on the computing device 120, or alternatively, the component management module 210 may reside on a separate computer, such as the host computer 120a.

The component management module 210 may communicate with the computing device 120 to selectively activate or deactivate the components 102 on the computing device 120. In one embodiment, a user selects a component 102 on the computing device 120 using the component selection module 214, which provides information such as whether the components 102 are activated or deactivated.

In response to selecting a component 102 to activate or deactivate, the remote access module 212 may transmit an authorization request to the authorization server 140. In response to receiving authorization to activate or deactivate the component 102, the component activation module 216 may send an authorization message such as an encrypted key to the computing device 120.

In certain embodiments, the activation module 222 within the computing device 120 receives the authorization message and activates the selected component 102 in response to reception of the authorization message. In response to activation of the selected component 102, the activation module 222 may send an activation confirmation to the log 218 on the component management module 214. In one embodiment, the activation confirmation contains component 102 identification information, customer identification information, billing information such as a billing receipt, and a time stamp corresponding to the time of activation or deactivation.

In one embodiment, the remote access module 212 receives the activation confirmation from the log 218 and transmits the activation confirmation to the tracking system 150. Thus, the tracking system 150 and the component management module 210 both contain a record of the activation or deactivation of the component 102. Keeping redundant copies of the record of the activation or deactivation provides an audit trail that protects the user and the entity from which the user has received authorization to activate or deactivate the component 102.

As an alternative to a user selecting a component 102 through the component selection module 214, the detection module 224 on the computing device 120 may detect high and low levels of computing usage and send a message to the component management module 210, which in turn sends an activation or deactivation request to the authorization server 140. The detection module 224 may also be configured by a user to send activation and deactivation requests according to activation criteria. In one embodiment, activation criteria include the computing load on the computing device 120, such as component 102 usage. For example, an activation criterion for a processor may be 90% utilization of the processor over a selected length of time. In response to detecting the 90% utilization on the processor over the selected length of time, the detecting module 224 may send an activation request to activate an additional processor.

In response to activation of a component 102, the log 218 may record an activation confirmation, and the remote access module 212 may send a confirmation to the tracking server 150. Information is thus preserved in at least two separate areas, providing a secure audit trail.

In one embodiment, the computing device 120 is a storage server. In another embodiment, the computing device 120 is a controller. One example of a controller is a RAID (Redundant Array of Independent Disks) controller, which controls storage devices in a RAID array of storage devices.

Examples of the components 102 include tape storage devices, storage space on a tape storage devices, microcode instructions, storage volumes, storage space on a storage volumes, memory modules, storage space on a memory modules, cache memories, storage space in cache memories, firmware modules, software modules, software libraries, network bandwidth, and processors. In addition, components 102 may also include controllers, interface adapter cards operably connected to controllers, microcode instructions for controllers, firmware updates for controllers, and memory operably connected to controllers. Other components 102 may be derived by one of ordinary skill in the art.

The present invention facilitates shipping computing devices 120 with a relatively large number of components 102 within the initial selective component activation apparatus 200 installation, such that users who desire to upgrade the computing device 102 need not order and install new components. Instead, the users simply activate particular components 102 already installed on the computing devices 120.

Figure 3:
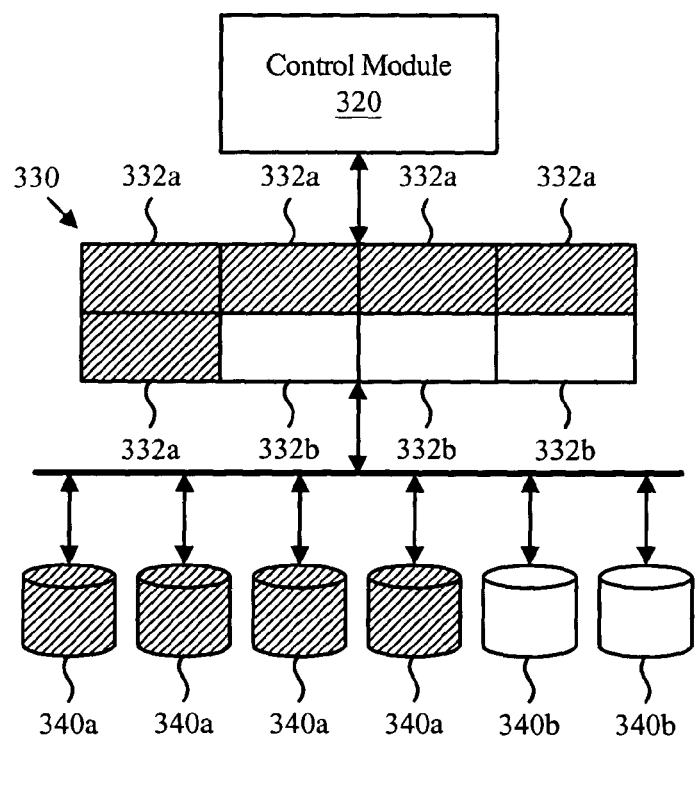
FIG. 3 is a block diagram illustrating one embodiment of a computing device of the present invention.

FIG. 3 is a block diagram illustrating a computing device 300 of the present invention. The computing device 300 is one example of a manner of implementation of the storage server 120c of FIG. 1. The depicted embodiment of the computing device 300 includes a control module 320, a cache 330, and storage devices 340. The cache 330 includes activated cache blocks 332a and deactivated cache blocks 332b. Likewise, the storage devices 340 include activated storage devices 340a and deactivated storage devices 340b.

In certain embodiments, the control module 320 receives storage commands and executes corresponding operations on the storage devices 340. Storage commands may include read commands and write commands. In one embodiment, the control module 320 sends the operations to the cache 330, which holds the operations until a storage device 340 is available to receive the operations.

Typically, reading and writing operations on the cache 330 maybe performed much more quickly than reading and writing operations on the storage devices 340. The cache 330 is consequently often very large in order to accommodate reading and writing large amounts of data. For example, data intended to be stored on the storage devices 340 is often written to the cache 330 and then later written to the storage devices 340 as a background process. Data that is read frequently from the storage devices 340 may also be stored in the cache 330 for faster access to that data.

During peak operating times, more cache 330 may be needed to handle a large volume of read and write operations. In one embodiment, the cache 330 includes several cache blocks 332 that may be activated or deactivated to provide different amounts of cache storage space. In response to a high volume of read and write operations, several cache blocks 332 may be activated to become activated cache blocks 332a in order to handle the computing load. During times of lower read and write volume, previously activated cache blocks 332a may be deactivated to save costs.

Similarly, a large amount of write data may require additional storage devices 340 to be activated. The storage devices 340 may be activated to become activated storage devices 340a as necessary. Likewise, in response to lower amounts of write data, storage devices 340 may be deactivated to become deactivated storage devices 340b.

Figure 4:
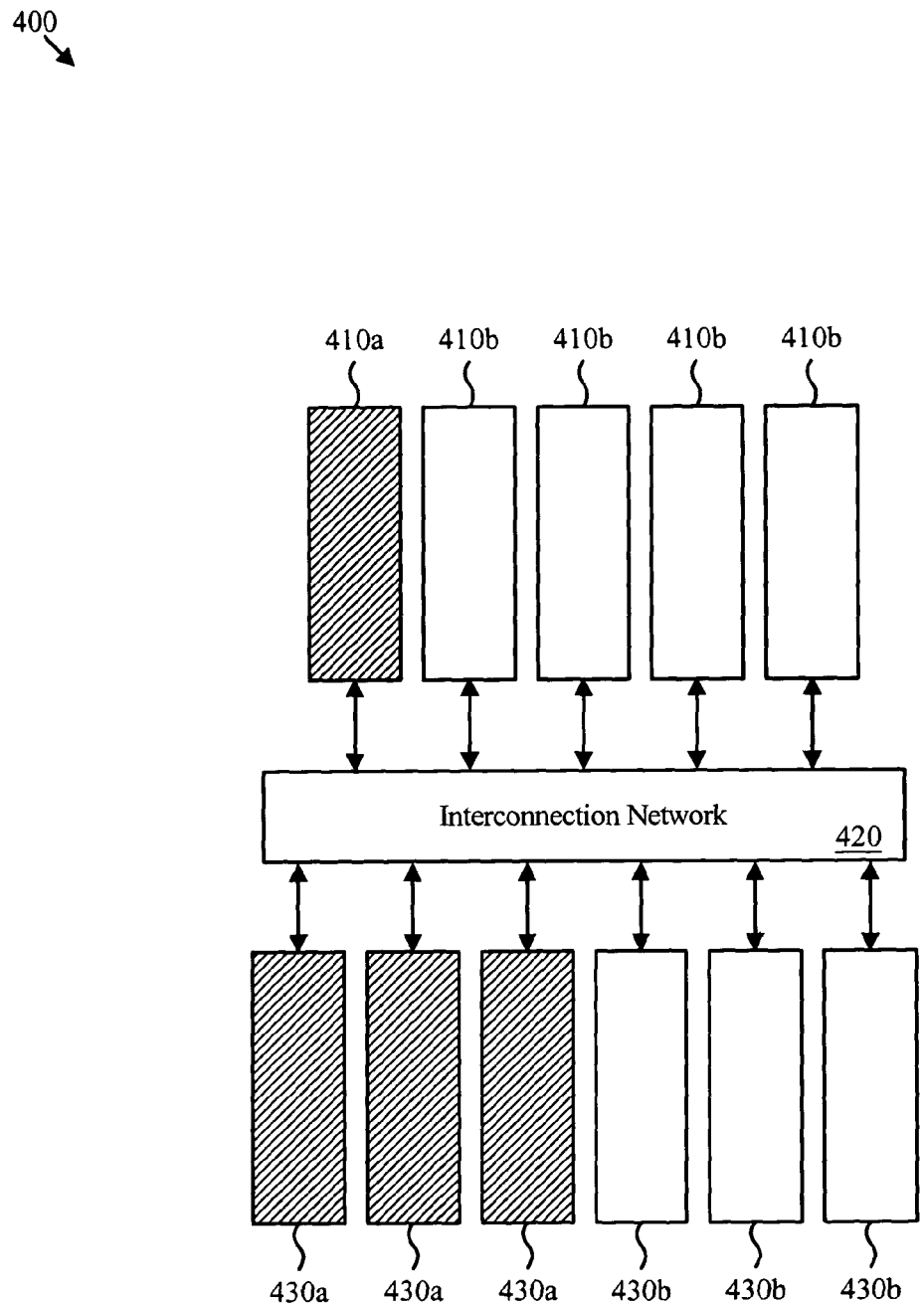
FIG. 4 is a block diagram illustrating another embodiment of the computing device of the present invention.

FIG. 4 is a block diagram illustrating a computing device 120 of the present invention. The computing device 120 is in the depicted embodiment a controller 400. The depicted embodiment of the computing device 400 as depicted includes processor interface adapters 410, an interconnection network 420, and auxiliary device adapters 430. The processor interface adapters 410 include an activated processor interface adapter 410a and deactivated processor interface adapters 410b. Similarly, the auxiliary device adapters 430 include activated auxiliary device adapters 430a and deactivated auxiliary device adapters 430b.

The controller 400 may be any controller appropriate to working with peripheral devices, or the like. For example, the controller 400 may be a storage controller such as the storage controller 320. In certain embodiments, the controller 400 receives commands from one or more processors (not shown) that are operably connected to the processor interface adapters 410. Through the interconnection network 420, the processor interface adapters 410 transmit the commands to one or more auxiliary interface adapters 430, which in turn execute operations corresponding to the processor commands on auxiliary devices (not shown) such as the storage devices 340 of FIG. 3.

In one embodiment, each processor interface adapter 410 operably connects to a different processor. Multiple processor interface adapters 410 may be activated to allow multiple processors to send commands to one or more auxiliary devices. As processing loads increase, deactivated processor interface adapters 410b may be activated to spread the processing load among multiple processors.

Similar to the processor interface adapters 410, each auxiliary device adapter 430 operably connects to one auxiliary device, and the deactivated auxiliary device adapters 430b may be activated to provide access to multiple auxiliary devices. For example, in a storage controller, such as the storage controller 320, the auxiliary device adapters 430 operably connect to storage devices, such as tape drives or the like. The deactivated auxiliary device adapters 430b may be activated to provide access to additional storage devices.

Figure 5:
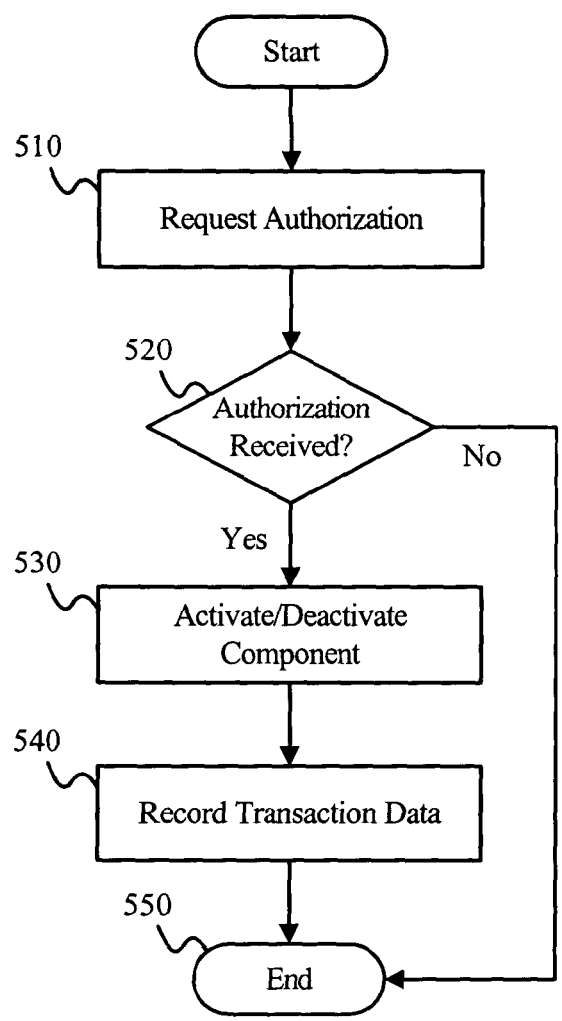
FIG. 5 is a flow chart diagram illustrating one embodiment of a component management method of the present invention.

FIG. 5 is a flow chart diagram illustrating one embodiment of a component management method 500 of the present invention. The depicted embodiment of the component management method 500 includes a request authorization step 510, an authorization received test 520, an activate/deactivate component step 530, a record transaction data step 540, and an end step 550. The component management method 500 provides secure authentication for component activation and deactivation and is described from the perspective of a customer location, such as the customer site 110 of FIG. 1.

The request authorization step 510 requests authorization to activate or deactivate a component, such as the component 102 of FIG. 1. In one embodiment, the control console 112 requests authorization to activate or deactivate the component. In another embodiment, the detection module 224 of FIG. 2 requests authorization to activate or deactivate the component.

The authorization received test 520 ascertains whether authorization has been received to activate or deactivate the component. In one embodiment, the control console 112 of FIG. 1 receives authorization from the authorization server 140 of FIG. 1. If authorization has been received, the method proceeds to the activate/deactivate component step 530. If authorization has not been received, the method proceeds to the end step 550.

The activate/deactivate component step 530 activates or deactivates a component by a module such as the activation module 222. Alternatively, the control console 112 activates or deactivates the component.

The record transaction data step 540 records transaction data related to an activated or deactivated component. Transaction data may include time stamp information corresponding to the time that the component was activated or deactivated, component identification data, customer identification data, billing data, and the like. The method concludes with the end step 550. The component management method 500 is an efficient process for dynamically scaling computing power in a secure manner.

FIG. 6 is a flow chart diagram illustrating one embodiment of a component management method 600 of the present invention. The depicted embodiment of the component management method 600 includes a select component step 610, a receive key step 620, a transmit key step 630, an activate/deactivate component step 640, and an end step 650. The component management method 600 is described from the perspective of a control console such as the control console 112.

The select component step 610 selects or facilitates selection of a component such as the component 102. The select component step 610 may also determine whether to activate or deactivate the component. In one embodiment, a user selects the component via a selection module such as the component selection module 214 of FIG. 2. Alternatively, the component may be selected automatically by a monitor module such as the detection module 224 or by a computing device, such as the computing device 120 of FIG. 1.

The receive key step 620 receives a key from an authorization system, such as the authorization server 140. In one embodiment, the component management module 210 receives the key from the authorization server 140. The key may be an encrypted key or the like.

The transmit key step 630 transmits the key to a computing device such as the computing device 120. In one embodiment, the component management module 210 transmits the key to the activation module 222 within the computing device 120. Alternatively, the component management module 210 may transmit the key directly to a component operably connected to the computing device.

The activate/deactivate component step 640 activates or deactivates the component. In one embodiment, a module such as the activation module 222 activates or deactivates the component in response to receiving the key from the component management module 210. The method concludes with the end step 650.

FIG. 7 is a flow chart diagram illustrating one embodiment of a transaction data recording method 700 of the present invention. The depicted embodiment of the transaction data recording method 700 includes a transmit confirmation step 710, a record transaction data step 720, an activate/deactivate automatic billing step 730, and an end step 740. The transaction data recording method 700 may be conducted in conjunction with the tracking system 150, of FIG. 1.

The transmit confirmation step 710 transmits confirmation of the activation or deactivation of a component such as the component 102 of FIG. 1 to a server such as the authorization server 140. For example, the control console 112 of FIG. 1 may transmit confirmation to the authorization server 140. Alternatively, a computing device 120 containing the component 102 may transmit confirmation directly to the authorization server 140.

The record transaction data step 720 records transaction data in the tracking system 150 or in a similar data repository. In one embodiment, the record transaction data step 720 also records transaction data at the customer site 110 in the log 218 or in another similar data store. Transaction data may include component identification data, customer identification data, time of component activation or deactivation data, billing data, or the like.

The activate/deactivate automatic billing step 730 employs a billing system, such as the billing system 160, to automatically generate charges against a customer's account in response to activation of a component, such as the component 102. In response to component deactivation, the activate/deactivate automatic billing step 730 automatically suspends charge generation against the customer's account.

The method completes with the end step 740. The transaction data recording method 700 provides transaction data for auditing purposes. In addition, the transaction data recording method 700 provides automatic billing activation and deactivation, which simplifies customer transactions.

Figure 8:
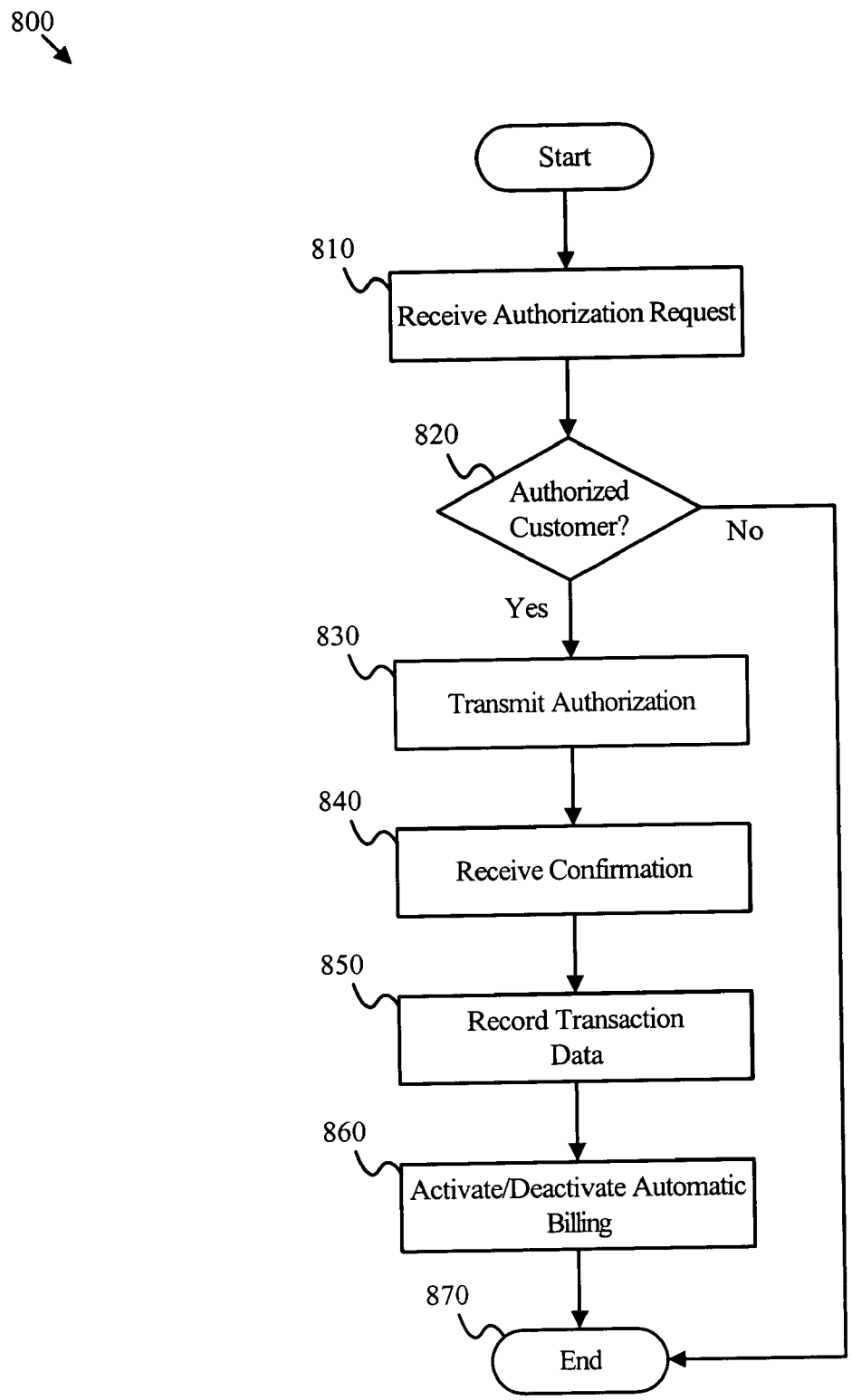
FIG. 8 is a flow chart diagram illustrating a further embodiment of the component management method of the present invention.

FIG. 8 is a flow chart diagram illustrating one embodiment of a component management method 800 of the present invention. The depicted embodiment of the component management method 800 includes a receive authorization request step 810, an authorized customer test 820, a transmit authorization step 830, a receive confirmation step 840, a record transaction data step 850, an activate or deactivate automatic billing step 860, and an end step 870. The component management method 800 is conducted from the perspective of an authorization system such as the authorization server 140 of FIG. 1.

The receive authorization request step 810 receives a request to authorize a customer to activate or deactivate a component such as the component 102 at a customer location, such as the customer site 110. In certain embodiments, receiving an authorization request 810 includes receiving a request transmitted from the control console 112 of FIG. 1. In one embodiment, a server such as the authorization server 140 receives the request.

The authorized customer test 820 ascertains whether a customer is authorized to activate or deactivate the component. If the customer is not authorized to activate or deactivate the component, the method proceeds to the end step 860. Conversely, if the customer is authorized to activate or deactivate the component, the method continues to the transmit authorization step 830.

The transmit authorization step 830 transmits authorization to a customer location, such as the customer site 110. In certain embodiments, transmitting authorization 830 includes transmitting an encrypted key from the authorization server 140 of FIG. 1 to the control console 112 of FIG. 1. The control console 112 may then transmit the encrypted key to a computing device, such as the computing device 120. Alternatively, transmitting authorization 830 may include transmitting authorization directly from the authorization server 140 to the computing device 120.

The receive confirmation step 840 receives confirmation of an activation or deactivation of the component. The authorization server 140 may receive the confirmation. Alternatively, the tracking system 150 may receive the confirmation. In addition, the billing system 160 may receive the confirmation in preparation for activating or deactivating automatic billing 860.

The record transaction data step 850 records transaction data in a storage system such as the storage system 155. Tracking data may include customer identification, component identification, and time and amount of purchase data. In one embodiment, the tracking system 150 records the transaction data in the storage system 155.

The activate/deactivate automatic billing step 860 employs a billing system such as the billing system 160 to automatically generate charges against a customer's account in response to activation of a component, such as the component 102. In response to component deactivation, the activate/deactivate automatic billing step 860 automatically suspends charge generation against the customer's account. The method concludes with the end step 870.

The present invention facilitates dynamically upgrading components and automatically billing for the component upgrades in a secure, seamless transaction. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for selectively activating a hardware component internal to a computing device, the apparatus comprising:
   the computing device comprising a processor and storage device;
   a detection module configured to request activation of a hardware component internal to a computing device in response to detecting an increased computing load on the computing device;
   an authorization server configured to authorize activation of the hardware component internal to the computing device in response to an activation request;
   a component management module configured to activate the hardware component in response to receiving authorization from the authorization server;
   a tracking system configured to receive transaction data corresponding to the hardware component in response to activating the hardware component; and
   the component management module further configured to deactivate the hardware component in response to authorization of a deactivation request originating from the computing device.

2. The apparatus of claim 1, wherein the component management module is further configured to deactivate the hardware component in response to an authorized deactivation request from a user.

3. The apparatus of claim 1, further comprising a billing system configured to generate charges against a customer account in response to activation of the hardware component.

4. The apparatus of claim 3, wherein the charges are based on a hardware component capacity.

5. The apparatus of claim 3, wherein the charges are based on usage of the hardware component.

6. The apparatus of claim 1, wherein the authorization module is further configured to transmit an encrypted key to the component management module in response to authorizing activation of the hardware component.

7. The apparatus of claim 6, wherein the computing device comprises an activation module configured to receive the encrypted key from the component management module and activate the hardware component in response to receiving the encrypted key.

8. The apparatus of claim 1, wherein the detection module is further configured to generate the deactivation request in response to detecting a decreased computing load on the computing device.

9. The apparatus of claim 1, wherein the component management module comprises a remote access module configured to communicate with the authorization server via an intersite network.

10. The apparatus of claim 9, wherein the intersite network is selected from the group consisting of a wide area network and the Internet.

11. The apparatus of claim 1, wherein the component management module comprises a component selection module configured to select the component from a group of hardware components internal to the computing device.

12. The apparatus of claim 1, wherein the component management module comprises a log configured to append transaction data in response to activating the hardware component.

13. The apparatus of claim 1, wherein the log is further configured to append transaction data in response to deactivating the hardware component.

14. The apparatus of claim 1, wherein transaction data comprises data selected from the group consisting of component identification data, user identification data, billing data, and time data corresponding to a time of activation of the hardware component.

15. The apparatus of claim 1, wherein the hardware component is selected from the group consisting of a tape storage device, storage space on a tape storage device, a storage volume, storage space on a storage volume, a memory module, storage space on a memory module, a cache memory, storage space in a cache memory, storage space configured to hold firmware, a network bandwidth regulator, and a processor.

16. The apparatus of claim 1, wherein the hardware component is selected from the group consisting of a controller, an interface adapter card operably connected to a controller, and a memory operably connected to a controller.

17. A method for selectively activating a hardware component internal to a computing device, the method comprising:
requesting authorization to activate a hardware component internal to a computing device in response to detecting an increased computing load on the computing device;
activating the hardware component in response to receiving authorization from an authorization server;
recording transaction data corresponding to the component in response to activating the hardware component; and
deactivating the hardware component if authorization for a deactivation request originating from the computing device is received.

18. The method of claim 17, further comprising deactivating the hardware component if authorization to a deactivation request from a user is received.

19. The method of claim 17, further comprising requesting payment from a customer in response to activating the hardware component.

20. The method of claim 17, further comprising transmitting an activation confirmation in response to activating the hardware component.

21. The method of claim 17, wherein receiving authorization comprises receiving an encrypted key.

22. The method of claim 21, wherein activating the hardware component in response to receiving authorization comprises activating the hardware component in response to receiving the encrypted key.

23. A method for selectively activating a hardware component internal to a computing device, the method comprising:
receiving a request to authorize activation of a hardware component internal to a computing device, the request generated in response to detecting an increased computing load on the computing device;
transmitting authorization from an authorization server to the computing device in response to authorizing the request;
receiving confirmation of the activation of the component in response to activation of the hardware component;
receiving a deactivation request corresponding to the hardware component and originating from the computing device; and
transmitting authorization of the deactivation request to the computing device in response to authorizing the deactivation request.

24. The method of claim 23, further comprising recording transaction data corresponding to the component in response to receiving confirmation of the activation of the hardware component.

25. The method of claim 23, further comprising generating charges against a customer account in response to receiving confirmation of the activation of the hardware component.

26. An apparatus for selectively activating a hardware component internal to a computing device, the apparatus comprising:
the computing device comprising a processor and storage device;
detection means for detecting an increased computing load on a computing device;
request means for generating an activation request for activating a hardware component internal to the computing device in response to detecting the increased computing load on the computing device;
activation authorization means for authorizing activation of a hardware component internal to a computing device in response to receiving the activation request;
activation means for activating the hardware component;
recording means for recording transaction data corresponding to the hardware component, in response to activation of the hardware component by the activation means;
deactivation authorization means for authorizing deactivation of the component internal to a computing device in response to receiving a deactivation request origination from the computing device; and
deactivation means for deactivating the hardware component.

27. A system for selectively activating a hardware component internal to a computing device, the system comprising:
a customer site;
an intersite server residing at the customer site, the intersite server operably connected to an intersite network;
a control console residing at the customer site, the control console operably connected to the internet server;

a computing device residing at the customer site, comprising a processor and storage device, the computing device operably connected to the control console;

an authorization server operably connected to the intersite network, the authorization server configured to authorize activation of a hardware component internal to the computing device in response to receiving a request generated in response to detecting an increased computing load on the computing device;

a component management module residing on the control console, the component management module configured to activate the hardware component in response to receiving authorization from the authorization server;

the component management module further configured to deactivate the hardware component in response to authorization of a deactivation request origination from the computing device; and a tracking system operably connected to the authorization server, the tracking system configured to receive transaction data corresponding to the component in response to activating the hardware component.

28. The system of claim 27, further comprising at least one support console configured to receive support requests from the customer site and perform support operations on the computing device.

29. The system of claim 27, further comprising a billing system operably connected to the intersite network, the billing system configured to charge a customer account in response to activating the hardware component.

30. A computer readable storage medium comprising computer readable program code for selectively activating a hardware component internal to a computing device, the program code configured to:

request authorization to activate a hardware component internal to a computing device in response to detecting an increased computing load on the computing device;

activate the component in response to receiving authorization from an authorization server;

record transaction data corresponding to the component in response to activating the hardware component; and deactivate the hardware component if authorization for a deactivation request originating from the computing device is received.

* * * * *